United States Patent
Rodriguez (10) Patent No.: US 9,812,926 B1
(45) Date of Patent: *Nov. 7, 2017

(54) MICRO-WIND TURBINE FOR THE POWER AND RECHARGE OF SATELLITE HOME AUTOMATION SENSORS

(71) Applicant: Carlos Rodriguez, Santa Ana, CA (US)

(72) Inventor: Carlos Rodriguez, Santa Ana, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/828,507

(22) Filed: Aug. 17, 2015

Related U.S. Application Data (60) Provisional application No. 62/038,200, filed on Aug. 15, 2014.

(51) Int. Cl.
*F24F 13/00* (2006.01)
*H02K 7/18* (2006.01)
*F24F 13/14* (2006.01)

(52) U.S. Cl.
CPC ........... *H02K 7/1823* (2013.01); *F24F 13/14* (2013.01)

(58) Field of Classification Search
CPC ........................................... F03D 9/002
USPC ....................................... 290/55, 44
See application file for complete search history.

(56) References Cited

U.S. PATENT DOCUMENTS

| | | | |
|---|---|---|---|
| 4,294,404 A | 10/1981 | Gajjar | |
| 4,671,458 A | 6/1987 | Fukuda et al. | |
| 5,119,987 A | 6/1992 | Kobayashi | |
| 5,180,333 A | 1/1993 | Shyu | |
| 5,251,815 A * | 10/1993 | Foye | G05D 7/0635 236/49.3 |
| 5,271,558 A * | 12/1993 | Hampton | F24F 13/06 236/49.3 |
| 5,364,304 A * | 11/1994 | Hampton | F24F 13/06 236/49.3 |
| 5,395,042 A | 3/1995 | Riley et al. | |
| 5,637,040 A | 6/1997 | Kim et al. | |
| 5,815,078 A | 9/1998 | Mun et al. | |
| 7,200,005 B2 * | 4/2007 | Von Gutfeld | G06F 1/20 290/55 |
| 7,208,846 B2 * | 4/2007 | Liang | F03D 9/00 290/1 R |
| 7,999,407 B2 * | 8/2011 | Saluccio | F03D 9/00 290/43 |
| 8,013,465 B2 * | 9/2011 | Gilbert | F03D 1/04 290/55 |
| 2006/0071087 A1 | 4/2006 | Kates | |

(Continued)

FOREIGN PATENT DOCUMENTS

| | | |
|---|---|---|
| EP | 0341022 A2 | 11/1989 |
| EP | 1985936 A1 | 10/2008 |
| WO | 2010074330 A1 | 7/2010 |

*Primary Examiner* — Joseph Waks
(74) *Attorney, Agent, or Firm* — Vista IP Law Group LLP; William A. English (57) ABSTRACT

Systems and methods are for generating electrical power using air moving through a duct of a forced air heating or air conditioning system within a building. In one embodiment, a wind turbine may be provided that is sized to be mounted within a duct and includes one or more blades coupled to a motor for converting kinetic energy from air moving the duct into electrical power. A device may be coupled to the motor for at least one of operating electrical components or sensors of the device and charging a battery of the device.

18 Claims, 4 Drawing Sheets

(56) References Cited

U.S. PATENT DOCUMENTS

| | | | |
|---|---|---|---|
| 2009/0072541 A1* | 3/2009 | Van Harselaar | F03D 1/025 290/54 |
| 2010/0244455 A1* | 9/2010 | Berginc | F03D 9/00 290/55 |
| 2011/0204646 A1* | 8/2011 | Farrell | F03D 9/003 290/54 |
| 2011/0253796 A1 | 10/2011 | Posa et al. | |
| 2011/0293419 A1* | 12/2011 | Koya | F03D 9/002 416/1 |
| 2012/0038162 A1* | 2/2012 | Smith, Jr. | F03D 9/002 290/52 |
| 2012/0181791 A1* | 7/2012 | Rennar | F03D 1/025 290/55 |
| 2012/0187698 A1* | 7/2012 | Bassett | F03D 3/005 290/55 |
| 2012/0286515 A1* | 11/2012 | Barzilai | F03D 9/00 290/52 |
| 2013/0341930 A1* | 12/2013 | Campagna | F03B 3/04 290/54 |
| 2014/0133965 A1* | 5/2014 | Ginsburg | F24J 3/08 415/122.1 |
| 2015/0130631 A1 | 5/2015 | Patel et al. | |
| 2015/0133043 A1 | 5/2015 | Patel et al. | |
| 2016/0091220 A1 | 3/2016 | Kates | |

\* cited by examiner

MICRO-WIND TURBINE FOR THE POWER AND RECHARGE OF SATELLITE HOME AUTOMATION SENSORS

RELATED APPLICATION DATA

This application claims benefit of provisional application Ser. No. 62/038,200, filed Aug. 15, 2014, the entire disclosure of which is expressly incorporated by reference herein.

FIELD OF THE INVENTION

The present invention relates generally to systems and methods for controlling, automating, and/or operating climate control systems, e.g., within a residence or other building, and, more particularly, to apparatus, systems, and methods for powering, charging, and/or maintaining devices, e.g., one or more remote sensors and/or actuators within a home or other building.

BACKGROUND

Heating and cooling a home is one of the largest energy expenditures in most households throughout the U.S., frequently accounting for over half of energy bills. Often times, thermostats are not located in the ideal position within a home, leaving major temperature variances between rooms. Some other obstacles that may lead to inefficiency of home cooling or heating systems include different room sizes, various distances between each room and the central air system, sunlight exposure to a room, and population of a room.

Within a household, the rooms that are farthest from the central air system may receive little air flow when compared to other rooms. For example, the farthest room from the central air system may be warmer in summer and colder in winter than the rest of the household due to reduced airflow.

Therefore, systems and methods for improving operation of AC or heating systems would be useful, e.g., to power one or more sensors and/or actuators, and/or to strategically channel air flow delivery toward rooms or zones in need.

SUMMARY

The present invention is directed to systems and methods for controlling, automating, and/or operating climate control systems, e.g., within a residence or other building. More particularly, the present invention relates to apparatus, systems, and methods for powering, charging, and/or maintaining devices, e.g., one or more remote sensors and/or actuators within a home or other building, e.g., for home automation systems within a connected smart home or building. For example, the apparatus, systems, and methods may be used to power batteries or remote sensors, e.g., within an air conditioning system, smoke detection system, alarm system, home lighting systems, and a communication and/or relay system, e.g., that receives and/or transponds low power RF signals and the like.

Generally, the systems and methods herein include a wind turbine or other generator that takes advantage of the kinetic energy from the wind generated by air traveling throughout a building's forced air HVAC system. Because the wind turbine is essentially mounted in a wind tunnel, it delivers a drastic increase in performance and creates an auxiliary in-home power source, e.g., for local devices coupled to the generator. For example, a micro-wind turbine may be mounted inside the existing ductwork of an HVAC system or mounted to an existing Smart Vent, such as those disclosed in co-pending U.S. application Ser. No. 13/830,840, the entire disclosure of which is expressly incorporated by reference herein.

In this setting, every time the HVAC system turns on for cooling, heating, or fan procedures, the generator may generate power to sustain itself and, optionally, recharge and/or maintain a battery, sensor, and/or other device coupled to the generator. For example, the generator may be coupled to a battery of a sensor and/or actuator to ensure that the device coupled to the generator never completely runs dead while the battery itself remains viable.

Optionally, the generator may include one or more flow directors, e.g., a conically-shaped hood scoops, that may funnel or otherwise direct at least a portion, e.g., a majority, of the air passing through the ductwork in a desired manner, e.g., to focus the flow of wind more directly across the blades of the wind turbine, which may improve the efficiency of the generator.

In accordance with an exemplary embodiment, a system is provided for generating electrical power using air moving through a duct of a forced air heating or air conditioning system within a building that includes a wind turbine sized to be mounted within a duct and comprising one or more blades coupled to a motor for converting kinetic energy from air moving the duct into electrical power; and a device coupled to the motor for at least one of operating electrical components or sensors of the device and charging a battery of the device.

In accordance with another embodiment, a method is provided for generating electrical power using air moving through a duct of a forced air heating or air conditioning system within a building that includes mounting a wind turbine within a duct such that, when air flows through the duct, a motor coupled to the wind turbine generates electrical power; and coupling a device to the motor to at least one of operate electrical components of the device and charge a battery of the device.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which:

FIGS. 5A-5C are perspective views of alternative embodiments of wind turbines that may be included in a generator system. FIGS. 5A and 5B are front and side views of an alternate blade design similar to that of an "Archimedes screw," which may be useful for applications where high wind and a low noise solution is desired.

DETAILED DESCRIPTION OF THE EXEMPLARY EMBODIMENTS

Figure 1A:
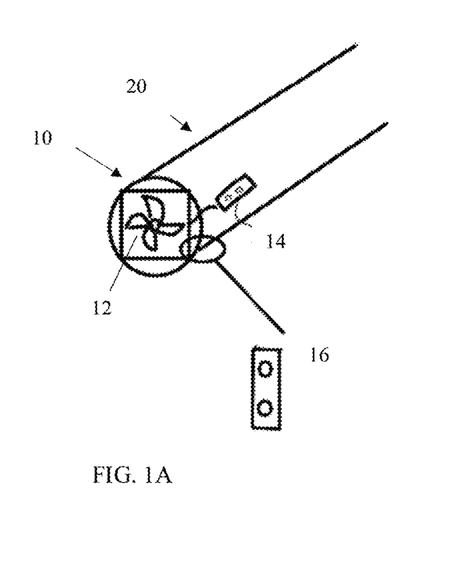
FIG. 1A is a perspective view of an exemplary embodiment of a generator system mounted within an HVAC duct, piping, or ventilation system.
Figure 2:
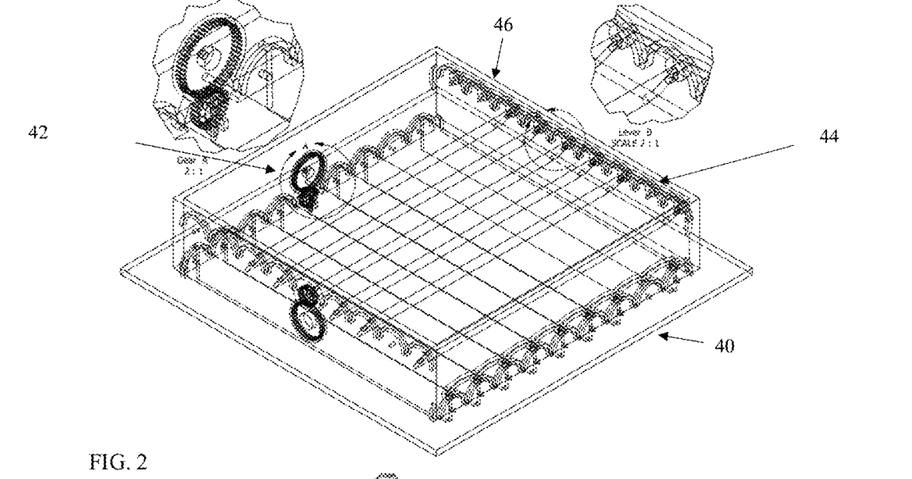
FIG. 2 is a perspective view of an exemplary embodiment of a servo and smart vent that may be coupled to a generator system, such as that shown in FIG. 1, for powering one or more sensors or actuators of the vent.
Figures 4A, 4B, 4C:
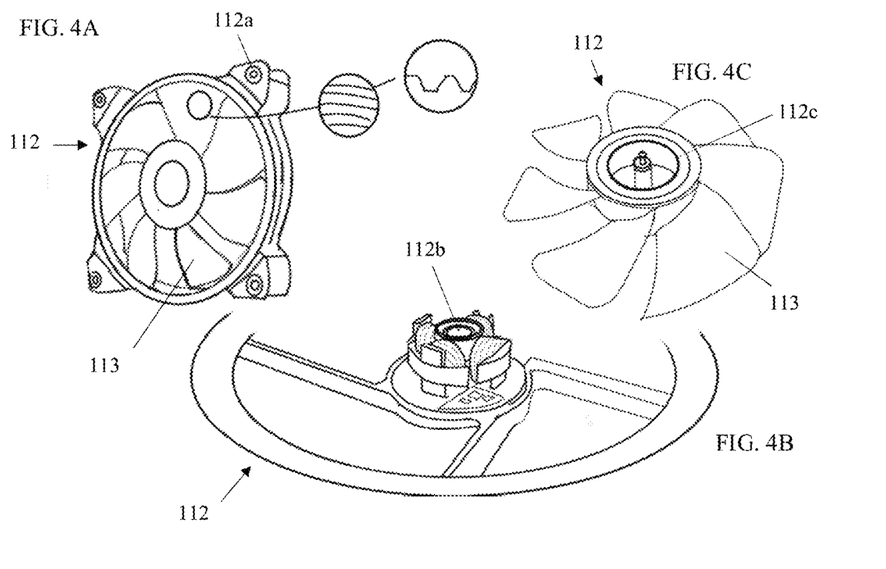
FIGS. 4A-4C are different views of an exemplary embodiment of a wind turbine that may be included in a generator system. In this embodiment, the turbine may be an adapted micro case fan. The case fan may include noise dampening grooved blades (FIG. 4A), an internal series of magnet wire coils with accompanying circuit board and internals (FIG. 4B), and/or an assembly of helically pitched blades to channel the wind attached to a shaft made of cylindrical magnets (FIG. 4C).
Figure 5A:
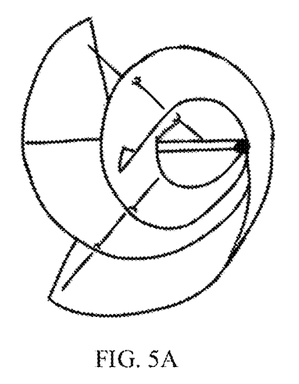
Figure 5B:
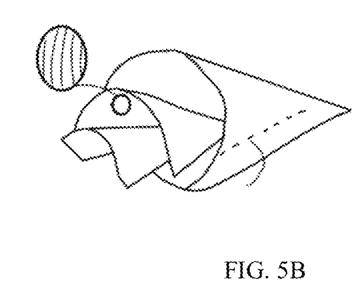
Figure 5C:
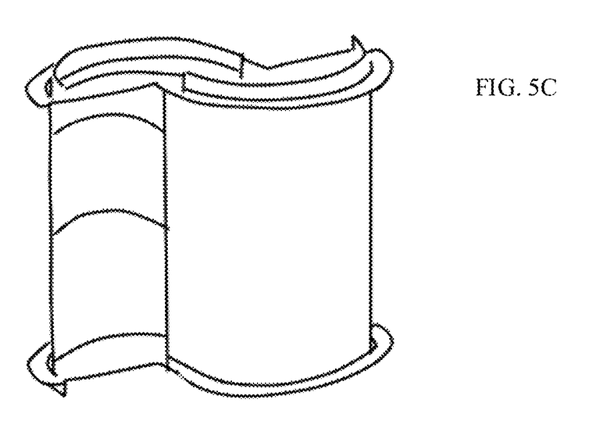
FIG. 5C is an alternate embodiment of a vertical axis wind turbine, which may be equipped with scoops that rotate about a center vertical shaft and sit on a lower magnet lined deck, e.g., for applications within square or rectangular duct work.
Figure 6:
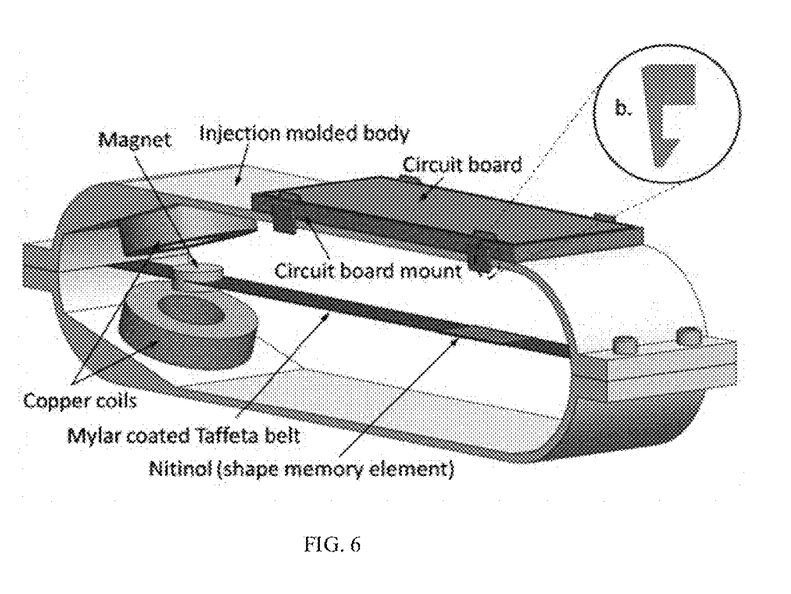
FIG. 6 is a perspective view of another exemplary embodiment of a generator system in which a thin ribbon like membrane flutters a magnet near a coil as wind passes over it.

Turning to FIG. 1A, an exemplary embodiment of a generator system 10 is shown that may be mounted or otherwise provided within a section of ductwork 20, e.g., within a building's forced air HVAC system (not shown). Generally, the system 10 includes a wind turbine 12 mounted at least partially across a width of the duct 20 or an inlet to a vent mounted adjacent the duct (not shown) to generate electricity, i.e., taking advantage of the kinetic energy from the wind generated by air traveling throughout the duct 20. The wind turbine 12 may be coupled to a device, such as a battery and/or one or more sensors or actuators 14. Because the wind turbine 12 is essentially mounted in a wind tunnel, it delivers a drastic increase in performance and creates an auxiliary in home power source, e.g., for local devices coupled to the wind turbine 12 (FIGS. 4A-4C). A micro-wind turbine may be mounted inside the existing ductwork of an HVAC system either and fixed in place, e.g., by magnets 16, outward facing wedge spring mounts, adhesives, and/or other connectors, or fixed to an existing Smart Vent, such as those disclosed in co-pending U.S. application Ser. No. 13/830,840, the entire disclosure of which is expressly incorporated by reference herein (e.g., vent 40 shown in FIG. 2, which includes servo motors 42 and mechanical fins and lever 44).

In this setting, every time the HVAC system turns on for cooling, heating, or fan procedures the wind turbine 12 may spin up and generate power to sustain itself and also recharge and/or maintain a battery and connected device or sensor 14. For example, the turbine 12 may operate such that a battery of a device 14 coupled to the wind turbine would never completely run dead while the battery itself remains viable.

Figure 1B:
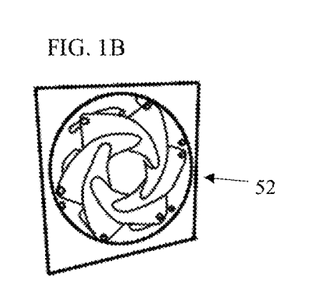
FIG. 1B is a perspective view of an aperture mechanism, similar to that found in the photography industry, in which spherical spring loaded louvers can be adjusted to let in varying amounts of light. In this embodiment, the device may be used to strategically choke off air delivery, reduce, and/or focus the wind flow delivered to the turbine, e.g., to increase velocity.
Figure 3:
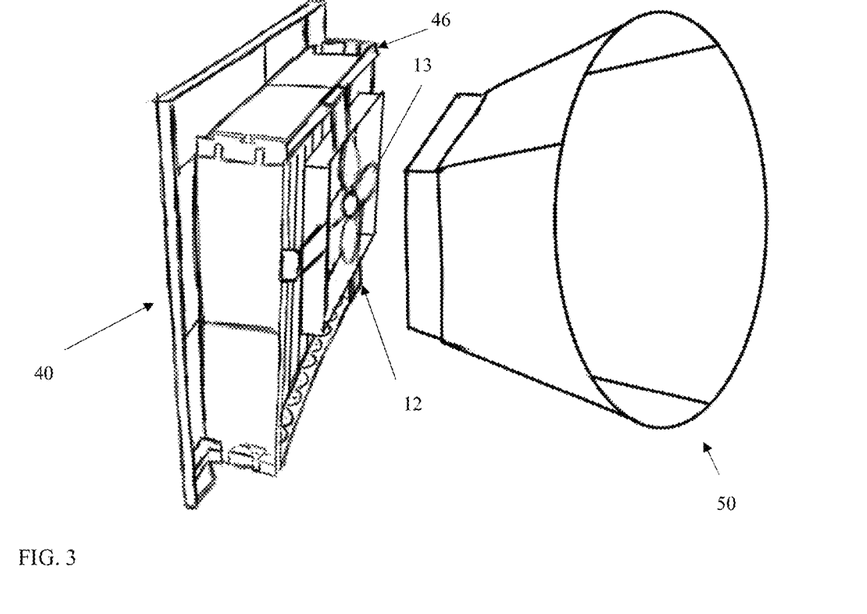
FIG. 3 is a perspective view of an exemplary embodiment of a smart vent including a wind turbine mounted to the frame and a conical air scoop that may be attached to the turbine for directing flow relative to the wind turbine.

Optionally, the wind turbine 12 may include one or more flow directors, e.g., a conically-shaped hood scoops 50, that may funnel or otherwise direct at least a portion, e.g., a majority, of the air passing through the ductwork, across the blades 13 of the wind turbine 12, which may improve the efficiency of the wind turbine 12 (e.g., as shown in FIG. 3). A hood scoop 50 may help the fluid dynamics of the air even diffusing the air behind the blades, e.g., creating a vacuum to overcome Betz's limit which is the physical cap on the energy able to be extracted from a conventional wind turbine (usually around 70%). The hood scoop 50 may also include an aperture slotted fin mechanism 52, e.g., similar to those used in the photography industry (e.g., as shown in FIG. 1B), effectively giving the scoop the capability to shrink duct size in times of high air flow. In a similar manner to the way the aperture in a camera adjusts the amount of light let into a camera, the wind flow aperture may be used to focus the flow of wind and/or increase the velocity of the turbine 12 in times of low wind flow, thereby artificially increasing the velocity of the turbine's spinning shaft and increasing power output even in times of low air flow.

In an exemplary embodiment, the wind turbine 12 may include a relatively low cost and/or readily available case fan, such as those used for cooling consumer electronics such as desktop PCs and server cases, but configured in reverse such that rotation of the fan blades generates an electrical current to charge a battery and/or operate an electric device. In one embodiment, the wind turbine 12 may include a plastic, injection molded square case fan 112 with circular blade array 113 and mounting holes 112a on the corners (e.g., as shown in FIGS. 4A-4C). The fan may be a traditional brushless DC motor 112b, e.g., including a magnetic cylinder with blades fixed on the perimeter, spinning in close proximity over an internal tightly wound coil of magnet wire (e.g., as shown in FIG. 4B) that may be converted to a power generator. In an alternate embodiment, a relatively small gear box 112c may be mounted to the blades and shaft (e.g., as shown in FIG. 4C), similar to that of a car transmission, to properly manage high torque delivered to the wind turbine, thereby magnify power delivery.

Using this design iteration, there are many mounting options and applications possible. For example, a recharge wind turbine 12 may be mounted on top of the frame 46 of a Smart Vent system, e.g., the vent 40 shown in FIG. 2, with adjustable height brackets (not shown) making it a modular and/or scalable design. For this application, the system may include one or more modular fans depending on the size of the application. This is useful especially for large scale smart vents that may be placed in auditoriums or large conference rooms, which may require multiple wind turbines to recharge all of their multiple batteries. The circuit boards on the fans may include the electronics necessary to convert the fan into a power generator, i.e., including one or more capacitors, diodes, and/or power-harvesting chips, in order to allow the system to collect power, rectify the power as needed, and/or correctly distribute the power to any or all of the desired components of the system (e.g., as shown in FIG. 4B).

In addition to the previously mentioned hood scoop adapter, in another embodiment, the system may also include a small gearbox (not shown), e.g., to multiply the power or rev down the rpms in periods of high air flow. In some embodiments, one or more grooves or rifling slots may be provided in the blades of the wind turbine and/or funnel, e.g., to cut down on wind resistance and/or humming noises that may occur at higher rpms, for example, to provide the end user with a substantially silent duct-based power-harvesting wind turbine (such as that shown in FIG. 4A).

The power generated from the apparatus and systems herein may be used to power a device such as a smart vent or standalone sensor, to recharge a battery, or store electricity for future use. Exemplary sensors or devices that may be coupled to the wind turbine and/or battery include one or more of motion sensors, microphones, cameras, infrared sensors, lighting control, home alarm sensors, listening/ auditory syncing devices, smoke alarms, LED signal lights, and carbon monoxide detectors. The power generated by the wind turbine may be used to power other existing sensors packages from competing companies with a modular power board and a standardized plug and hub setup, integrated with, or separate from the smart vent. With the use of this technology, it may be possible to have a fully integrated modular retrofit home automation platform. Costly solutions are available now but require a third party company to come in, evaluate a building, and send a contractor to install separate zoning technology at a cost of several thousand dollars.

With the apparatus and systems herein, it may be possible for the end user to go to the store, buy the desired units off the shelf, choose the appropriate vent size, sensors, and/or hardware, install the modular sensor pack, and then install the desired generator systems themselves the same day. Optionally, once in operation, the system may collect and broadcast valuable smart home data, e.g., via zigbee radio or other wireless communication, and, optionally, aggregate the data and/or make it available online for a multitude of applications and automation algorithms.

In other embodiments, a generator system may be provided for smoke detectors used to detect home fires and/or gas leaks, with the capability of alerting emergency responders or home owners via the internet, even letting them know the zones in which human presence was last detected after a power outage. This may prove to be useful in disaster relief situations, e.g., in which there is no longer building electricity and first responders are looking for survivors in building rubble with no power, e.g., where a self-powered sensor network is effectively still transmitting data. Alternately, LED lights may be used almost as a night light of sorts within a home in situations where low light is adequate, e.g., a plurality of lights coupled to a single generator that may provide power to the lights when existing building power is lost. Optionally, the LED lights may be networked and may be used to light a pathway to direct people to safety in a low visibility or smoke filled room. Optionally, the system may include onboard infrared motion sensors for home security purposes, lighting control, or other home alarm solutions. The system may include one or more microphones mounted at desired locations, e.g., to detect a crying baby, a broken window, or other sound stimulus. Signals from the microphone(s) may be communicated to a central controller or server of the system, e.g., wirelessly, whereupon the system may alert the home owner of the incident. In addition or alternatively, the system may include window and/or door sensors, e.g., such that the system does not operate the air-conditioning while the doors and windows are open as an added measure of efficiency. In an exemplary embodiment, in a smart home/building of the future, all of the sensors may be integrated seamlessly and a central app may be provided for home alarm, pool control, sprinklers, lights, and the like.

Though the wind turbine may operate as a standalone device, delivering power to areas where it was once impossible or too difficult to hard wire, a particularly useful application is mounting or otherwise coupling the components of the wind turbine (e.g., fan, battery, and other electrical components) to a Smart Vent or other A/C system. The Smart Vent may include an automated HVAC register vent, e.g., equipped with servo motors for aiming and/or closing off air flow to a zone within a building, e.g., as disclosed in the application incorporated by reference herein. The system may include one or more motion sensors, temperatures sensors, and wireless zigbee microcontrollers for the remote monitoring of specific zones for HVAC control.

In an exemplary embodiment, with this system, it may be possible to deliver conditioned air only to areas of a home or building that are occupied by humans while shutting off airflow to vacant rooms, thereby cutting run time and energy cost by micromanaging the delivery of air flow. Used in conjunction with such Smart Vents, the controller may strategically channel airflow to certain vents, thereby increasing the amount of power harvested by a specific wind turbine. This may be useful in situations where a battery on one smart vent is running low—the affected vent may have the capability to "call for help" and ask to run the fan, e.g., for twenty minutes or other predetermined time, e.g., in the middle of the day, to recharge a struggling battery.

There may also be rule sets used by the controller in which the vent is never allowed to let the battery die with the vent closed, since the vent cannot be opened to charge its battery. Thus, if a battery for a vent is indicated as low, the controller for that vent may open the vent a minimum amount to ensure that airflow may be directed through the vent (and consequently through its wind turbine) to allow the battery to charge back up when airflow finally does turn on. The systems and methods may include special rule sets, e.g., to handle uncommon situations, such as a pet left at home indoors during the day or a bedroom with a sleeping occupant.

Furthermore, using this same technology, the Smart Vent may be able to approximate airspeed, volume of airflow, and the like delivered at each specific vent at any given time using a sensor coupled to the fan of the wind turbine, for example, based on the voltage coming off of the wind turbine (e.g., assuming the system is calibrated properly and all other conditions are kept the same). Using this capability the home owner may be able to know the exact air flow delivery, wind speed, and volume in cubic feet per minute of air delivered in each of the zones of the building, e.g., being able to manage the pressure delivered at each point in the house and not pushing the ductwork beyond its recommended pressure ratings causing duct failure. Also with the use of this data it may be possible to properly manage and see performance over the life of the home blower fan attached to the home ac unit, e.g., being able to manage stress on the motor and see performance decline over time. Also with the wind turbine mounted behind the air filter/return of an HVAC system, the system may be able to alert the user of one or more conditions, e.g., reduced air flow due to dirty filter and notify the user to change the air filter, helping the system to run more efficiently.

Alternately, in another embodiment, another independent use for the devices and systems herein is to power devices, e.g., safety lights or sensors, in areas specifically where there is air flow delivery but no power, such as sewers or mine shafts. For example, a wind turbine device may be mounted at and user-determined intervals along a ventilation shaft to deliver power where needed.

In an alternative embodiment, a wind turbine may collect power and monitor performance from the spinning blades of the A/C unit's heat exchanger pump mounted outside. This power may also be used to power weather sensors and/or forecast data directly outside the user's home.

The wind turbine design for the apparatus and systems herein is not limited to a traditional blade and propeller design. Fin design may change to accommodate different wind speeds and noise requirements shape. It may be more efficient to use different designs such as a vertical axis Savonious wind turbine design or Archimedes screw shaped blades. In other alternatives, other generators may be used, such as a flapping wing like structure, a cloth membrane fixed with magnets and coils, piezoelectric fabric, and the like configured to generate electrical power, e.g., based on the aero elastic flutter concepts, moving a fixed permanent magnet near a coil of magnetic wire, altering its magnetic field, and the like to generate power. Summary of Auxiliary Uses

- Monitor wind speed within a duct and airflow volume based on voltage coming off the turbine. Also use data for analysis by air conditioner manufacturers on real life performance.
- Retrofit; user-installed platform for the maintenance of smart home sensors.
- Recharge of battery on smart vent airflow partitioning and zoning devices.
- Recharge of sensors on any moving vehicle. For example a small GPS sensor on a moving cargo train. Recharges every time it moves.
- Solutions for powering and networking total smart home solutions including: alarm, smoke and gas detection, lighting control, garage openers, sprinklers, pool filter controls, outdoor weather sensors on roof or in garden.
- Powering of energy efficient security cameras.
- Platform for the monitoring and powering of hypoallergenic electronic air filters for users with allergies.
- Wind turbine recharge system can be applied to monitor fluid water flow within a pipe using an impeller instead of a wind turbine. Applications may include notification of leaks, remotely recharging the flow sensor, and/or making water usage statistics available for home owners or municipalities.

It will be appreciated that elements or components shown with any embodiment herein are exemplary for the specific embodiment and may be used on or in combination with other embodiments disclosed herein.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A system for generating electrical power using air moving through a duct of a forced air heating or air conditioning system within a building, comprising:
   - a wind turbine sized to be mounted within a duct and comprising one or more blades coupled to a generator for converting kinetic energy from air moving through the duct into electrical power; and
   - a device coupled to the generator comprising one or more electrical components or sensors and a battery for providing electrical power to the electrical components or sensors of the device and coupled to the generator for charging the battery; and
   - a controller coupled to the battery to monitor a power level of the battery, the controller configured to communicate with an HVAC system to activate the HVAC system to deliver air into the duct to charge the battery.

2. The system of claim 1, wherein the device is configured to be isolated from an electrical system of the building such that the wind turbine is the only electrical power source for the device.

3. The system of claim 1, wherein the device comprises one or more sensors mountable within the duct, a ventilation shaft, or a room adjacent the duct, and one or more wires coupled between the generator and the one or more sensors.

4. The system of claim 3, wherein the device comprises a vent configured to be mounted in an opening in a room for directing air from the duct into the room, the vent comprising one or more fins and one or more actuators coupled to the fins for adjusting the orientation of the fins for directing the air into the room or sealing off unused rooms, the battery coupled to the one or more actuators for adjusting the orientation of the fins.

5. The system of claim 1, wherein the device comprises a smoke detector.

6. The system of claim 1, wherein the device comprises one or more sensors for detecting human presence, and wherein the controller is configured to transmit data regarding human presence from the one or more sensors after a power outage to alert emergency responders or home owners of zones in which human presence was last detected.

7. The system of claim 1, wherein the controller is coupled to the wind turbine to approximate one or more of airspeed, volume of airflow, and pressure within the duct, the controller configured to communicate the one or more of airspeed, volume of airflow, and pressure to the HVAC system.

8. The system of claim 7, wherein controller is coupled to the wind turbine to approximate one or more of airspeed, volume of airflow, and pressure within the duct based on a voltage from the generator.

9. The system of claim 1, wherein the controller is coupled to the wind turbine to approximate one or more of airspeed, volume of airflow, and pressure within the duct, the controller configured to communicate the one or more of airspeed, volume of airflow, and pressure to the HVAC system to allow the HVAC system to at least one of manage pressure delivered at each point in the building, limit the system from operating beyond its recommended pressure ratings, and manage performance of a blower fan of the HVAC system.

10. A system for operating an air conditioning vent, comprising:
    - a vent configured to be mounted in an opening in a room communicating with an air duct for directing air from the duct into the room, the vent comprising one or more fins and one or more actuators coupled to the fins for adjusting the orientation of the fins for directing the air into the room or sealing off unused rooms;
    - a battery coupled to the one or more actuators for providing electrical power to the one or more actuators to adjust the orientation of the fins;
    - a wind turbine configured to be mounted adjacent the vent such that wind turbine is exposed to air flow moving through the duct to the vent, the wind turbine comprising a generator for converting kinetic energy from air moving through the duct into electrical power, the generator coupled to the battery for charging the power storage device; and
    - a controller coupled to the one or more actuators and the battery, the controller configured to operate the one or more actuators to open the one or more fins of the vent when the battery is low on power.

11. The system of claim 10, wherein the wind turbine is mounted to a frame of the vent.

12. The system of claim 10, wherein the controller is configured to determine when the battery is charged back up when airflow returns through the duct.

13. The system of claim 10, wherein the controller is coupled to the wind turbine to approximate one or more of airspeed, volume of airflow, and pressure within the duct, the controller configured to communicate the one or more of airspeed, volume of airflow, and pressure to the HVAC system.

14. A system for operating an air conditioning vent, comprising:
- a vent configured to be mounted in an opening in a room communicating with an air duct for directing air from the duct into the room, the vent comprising one or more fins and one or more actuators coupled to the fins for adjusting the orientation of the fins for directing the air into the room or sealing off unused rooms;
- a battery coupled to the one or more actuators for providing electrical power to the one or more actuators to adjust the orientation of the fins;
- a wind turbine configured to be mounted adjacent the vent such that wind turbine is exposed to air flow moving through the duct to the vent, the wind turbine comprising a generator for converting kinetic energy from air moving through the duct into electrical power, the generator coupled to the power storage device for charging the battery; and
- a controller coupled to the battery to monitor a power level of the battery, the controller configured to communicate with an HVAC system to activate the HVAC system to deliver air into the duct to charge the battery.

15. The system of claim 14, wherein the wind turbine is mounted to a frame of the vent.

16. The system of claim 14, wherein the controller is coupled to the wind turbine to approximate one or more of airspeed, volume of airflow, and pressure within the duct, the controller configured to communicate the one or more of airspeed, volume of airflow, and pressure to the HVAC system.

17. The system of claim 16, wherein controller is coupled to the wind turbine to approximate one or more of airspeed, volume of airflow, and pressure within the duct based on a voltage from the generator.

18. The system of claim 14, wherein the controller is coupled to the wind turbine to approximate one or more of airspeed, volume of airflow, and pressure within the duct, the controller configured to communicate the one or more of airspeed, volume of airflow, and pressure to the HVAC system to allow the HVAC system to at least one of manage pressure delivered at each point in the building, limit the system from operating beyond its recommended pressure ratings, and manage performance of a blower fan of the HVAC system.

* * * * *